(12) United States Patent
Chan et al.

(10) Patent No.: US 9,183,314 B2
(45) Date of Patent: Nov. 10, 2015

(54) PROVIDING BROWSING HISTORY ON CLIENT FOR DYNAMIC WEBPAGE

(75) Inventors: Yuk L. Chan, Poughkeepsie, NY (US); Gisela C. Cheng, Poughkeepsie, NY (US); Kin Ng, Wappingers Falls, NY (US); Derrick L. Washington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/447,475

(22) Filed: Apr. 16, 2012

(65) Prior Publication Data

US 2013/0275493 A1    Oct. 17, 2013

(51) Int. Cl.
G06F 15/16 (2006.01)
G06F 17/30 (2006.01)

(52) U.S. Cl.
CPC ............................. *G06F 17/30876* (2013.01)

(58) Field of Classification Search
CPC ... G06F 17/30902; G06F 17/30; G06F 15/16; H04L 67/02
USPC ............ 709/203, 234; 715/838; 707/705, 706
See application file for complete search history.

(56) References Cited

U.S. PATENT DOCUMENTS

| 5,978,842 | A  | * | 11/1999 | Noble et al. ................... 709/218 |
| 6,012,087 | A  |   | 1/2000  | Freivald et al. |
| 6,667,751 | B1 | * | 12/2003 | Wynn et al. .................... 715/833 |
| 6,820,111 | B1 | * | 11/2004 | Rubin et al. ................... 709/203 |
| 6,848,075 | B1 | * | 1/2005  | Becker et al. ................. 715/205 |
| 6,959,319 | B1 | * | 10/2005 | Huang et al. .................. 709/203 |
| 7,076,495 | B2 | * | 7/2006  | Dutta et al. ........................ 1/1 |
| 8,005,946 | B2 |   | 8/2011  | Le Roy et al. |
| 8,380,856 | B1 | * | 2/2013  | Nedderman et al. .......... 709/227 |
| 2003/0189647 | A1 | * | 10/2003 | Kang ....................... 348/207.99 |
| 2004/0003351 | A1 | * | 1/2004  | Sommerer et al. ............ 715/517 |
| 2005/0108418 | A1 | * | 5/2005  | Bedi et al. ..................... 709/232 |
| 2006/0224997 | A1 | * | 10/2006 | Wong et al. ................... 715/838 |
| 2007/0288589 | A1 | * | 12/2007 | Chen et al. .................... 709/217 |
| 2008/0059544 | A1 | * | 3/2008  | Rahim .......................... 707/204 |
| 2009/0024962 | A1 | * | 1/2009  | Gotz ............................. 715/838 |
| 2009/0119254 | A1 | * | 5/2009  | Cross et al. ....................... 707/3 |
| 2009/0287658 | A1 |   | 11/2009 | Bennett |
| 2010/0005053 | A1 |   | 1/2010  | Estes |
| 2010/0318500 | A1 | * | 12/2010 | Murphy et al. ............... 707/693 |
| 2011/0197150 | A1 | * | 8/2011  | Huang .......................... 715/760 |
| 2011/0208732 | A1 | * | 8/2011  | Melton et al. ................. 707/728 |
| 2012/0066380 | A1 | * | 3/2012  | Gao et al. ...................... 709/224 |
| 2012/0166952 | A1 | * | 6/2012  | Alexandrov et al. ......... 715/730 |

OTHER PUBLICATIONS

Lazarus: Form Recovery. Internet Archive. [ > database online], [retrieved on Jan. 6, 2014]. Retrieved from the Internet < URL:> https://web.archive.org/web/20120106140932/https://addons.mozilla.org/en-US/firefox/addon/lazarus-form-recovery/ <.*

(Continued)

*Primary Examiner* — Brian J Gillis
*Assistant Examiner* — Austin Moreau
(74) *Attorney, Agent, or Firm* — Cantor Colburn LLP; William A. Kinnaman, Jr.

(57) ABSTRACT

A technique is provided for capturing browsing history of a webpage. A processor receives a webpage from a server, determines that a trigger associated with a user is fulfilled, and captures a page of the webpage responsive to the trigger associated with the user being fulfilled.

21 Claims, 6 Drawing Sheets

(56) References Cited

OTHER PUBLICATIONS

ThumbStrips. Internet Archive. [ > database online], [retrieved on Jan. 6, 2014]. Retrieved from the Internet < URL:> https://web.archive.org/web/20100409004747/http://thumbstrips.sourceforge.net/ <.*

ThumbStrips. Internet Archive. [ > database online], [retrieved on Jan. 6, 2014]. Retrieved from the Internet < URL:> https://web.archive.org/web/20100409004747/http://thumbstrips.sourceforge.net/ <.*

Boomtango. Internet Archive. [ > database online], [retrieved on Jan. 6, 2014]. Retrieved from the Internet < URL:> https://web.archive.org/web/20091003102459/http://www.boomtango.com/ <.*

* cited by examiner

PROVIDING BROWSING HISTORY ON CLIENT FOR DYNAMIC WEBPAGE

BACKGROUND

Exemplary embodiments relate to web browsing, and more specifically, to providing history of a webpage for a user.

A web browser (also referred to as a browser) is a software application for retrieving, presenting, and traversing information resources on the World Wide Web. The primary purpose of a web browser is to bring information resources to the user. This process begins when the user inputs a uniform resource locator (URL) and/or a uniform resource identifier (URI) into the browser. The prefix of the URL (or URI) determines how the URL will be interpreted.

An information resource is identified by a URI/URL, and the information resource may be a webpage, image, video, or other piece of content. Hyperlinks enable users to easily navigate their browsers to related resources. A web browser can also be defined as an application software or program designed to enable users to access, retrieve, and view documents and other resources on the Internet.

Although browsers are primarily intended to access the World Wide Web, they can also be used to access information provided by web servers in private networks or files in file systems. Some examples of the major web browsers include Google® Chrome, Internet Explorer®, Firefox®, etc.

BRIEF SUMMARY

According to an exemplary embodiment, a method for capturing browsing history of a webpage is provided. The method includes a processor receiving a webpage from a server, determining that a trigger associated with a user is fulfilled, and capturing a page of the webpage responsive to the trigger associated with the user being fulfilled.

According to an exemplary embodiment, a system for capturing browsing history of a webpage is provided. The system includes memory configured to store a program and a processor functionally coupled to the memory. The processor is responsive to computer-executable instructions contained in the program and operative to receive a webpage from a server, determine that a trigger associated with a user is fulfilled, and capture a page of the webpage responsive to the trigger associated with the user being fulfilled.

According to an exemplary embodiment, a computer program product for capturing browsing history of a webpage. The computer program product includes a computer readable storage medium having computer readable program code embodied therewith. The computer readable program code includes a processor receiving a webpage from a server, determining that a trigger associated with a user is fulfilled, and capturing a page of the webpage responsive to the trigger associated with the user being fulfilled.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

The use of web browsers has expanded from general information surfing to other applications, such as e-commerce, remote access of backend business applications (such as the hardware management console (HMC) user interface by IBM®), and online tools/applications (e.g., mortgage calculator). Many technologies have been developed on the client side (e.g., browsers, forms, JavaScript®, Flash®, etc.) and the server side (e.g., servlet, streamed video, etc.). Due to the differences in behavior from the various technologies and the nature of the applications, the webpage displayed to the user could have different behaviors that affect the webpage's content. The content of the webpage may be such as static, dynamic, automatically refreshed, complete reload of content during a refresh, etc.

These different technologies and behaviors dictate different behavior in the browsing history (i.e., when using the back button and forward button in a browser). For example, the HMC user interface (UI) provides live data refreshed periodically, and using the "back" and "forward" buttons on a browser would not give the user the previous set of data. Instead, the back button will go to the previous screen. Also, online forms do not store the inputted data locally (for the user), and the data is lost after the form is submitted. This behavior is desirable in some cases for security reasons, but in other cases, the user might want to go back and look at what her or she has filled in, but will not be able to.

Individual applications (such as the HMC UI) implement a historical data retrieval mechanism, where the historical data points are stored in a database. A user can retrieve the data in the past by specifying a time interval. However, this type of historical data retrieval is often implemented using a database where data are stored at pre-determined intervals (e.g., once every 10 minutes). If the user wants to retrieve data outside of the pre-determined interval or at different granularity (5 minutes), this would be impossible. Also, the type of data that is available as history and in the database is subject to the particular application. For example, the user cannot choose the data that has history.

Exemplary embodiments provide a mechanism at the browser and/or middleware level to capture browsing history for a particular webpage(s). This mechanism allows all the technologies to work consistently, and also, provides more customizable configurations (any interval) to the user.

Figure 1:
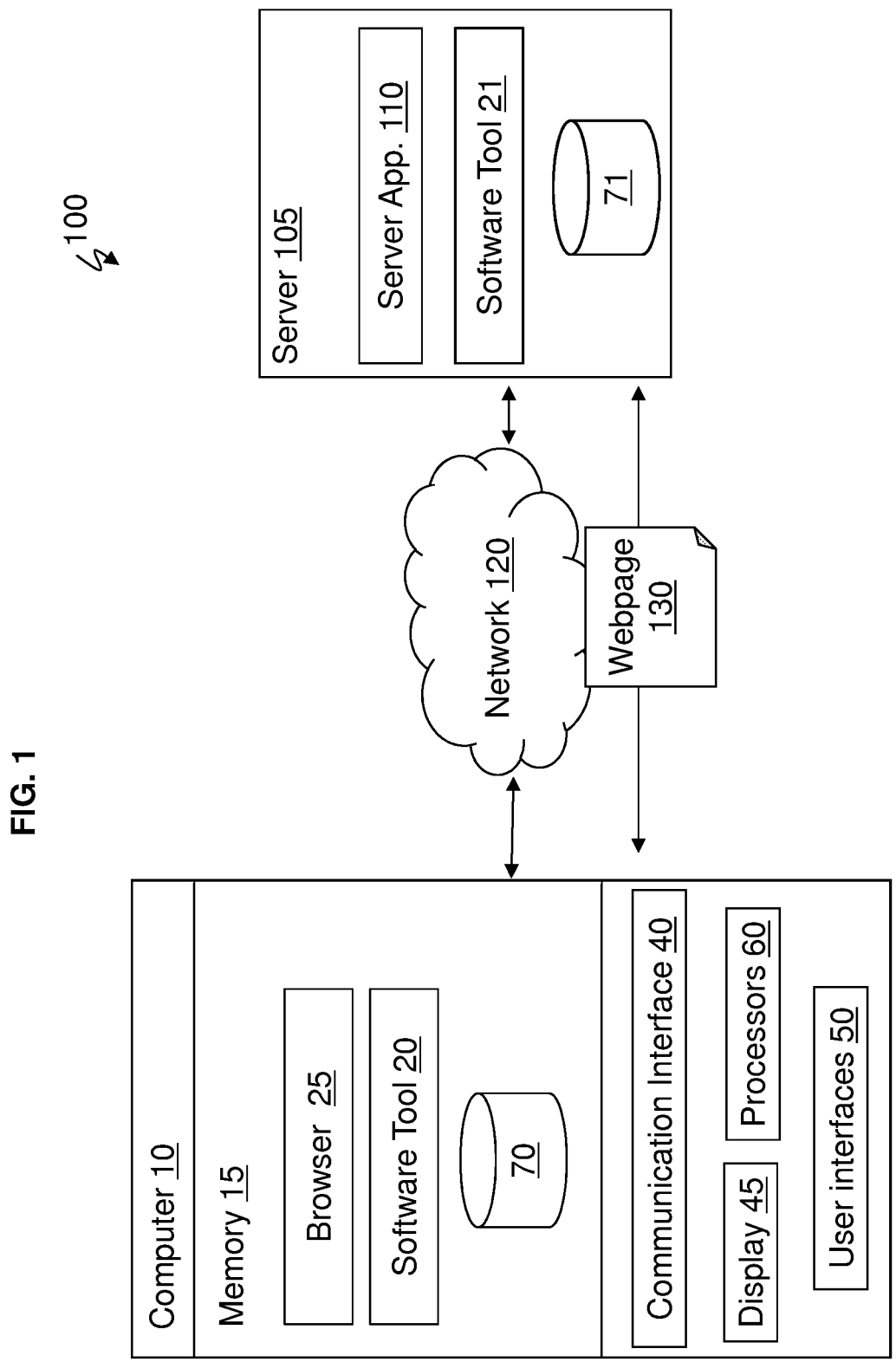
FIG. 1 is a block diagram of a system with a computer system operatively connected to one or more web servers in accordance with an exemplary embodiment.

Now turning to the figures, FIG. 1 illustrates a block diagram of a system 100 with a computer system operatively connected to one or more web servers in accordance with an exemplary embodiment.

The system 100 depicts a computer 10 which can represent one or more different types of computing devices. The computer 10 may include and/or be coupled to memory 15, a communication interface 40, a display 45, user interfaces 50, processors 60, and a software tool 20. The communication interface 40 comprises hardware and software for communicating over a network 120. The network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 facilitates transmission of media (e.g., images, video, data, multimedia messaging, etc.) from content services provider systems (such as the server 105) to customers/users via devices, such as the computer 10, through a broadband connection.

The user interfaces 50 may include, e.g., a track ball, mouse, pointing device, keyboard, touch screen, etc., for interacting with the computer 10, such as inputting information, making selections, etc.

The computer 10 includes memory 15 which may be a computer readable storage medium. One or more software applications such as the software tool 20 (module) and browser 25 may reside on or be coupled to the memory 15. The software tool 20 comprises logic and software components to operate and function in accordance with exemplary embodiments in the form of computer executable instructions. The software tool 20 may include a graphical user interface (GUI) which the user can view and interact with. Although the software tool 20 is shown as a single element in FIG. 1 for conciseness, the software tool 20 may represent numerous software components (or modules) according to an exemplary embodiment, as further discussed in FIG. 2. The browser 25 is configured with the logic and software components to operate as a web browser as understood by one skilled in the art. The memory 15 may also include a database 70 of history of various webpages as discussed herein.

The computer 10 is operational with numerous other general purpose or special purpose computing system environments or configurations. The computer 10 may be representative of well-known computing systems, environments, and/or configurations which include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

In FIG. 1, the system 100 also includes various web servers represented as server 105. The server 105 includes a server application 110 configured to provide server functions and operations including serving webpages (such as webpage 130) to the computer 10 over the network 120. The computer 10 and server 105 are configured to operate in a server-client relationship as understood by one skilled in the art. The software tool 21 of the server 105 is configured to operate with the logic and components of the software tool 20, and any discussion of the software tool 20 operating on the computer 10 applies to the server 105 via a connection over the network 120. Similarly, the database 71 is configured to store the historical information of a webpage for the user of the computer 10 just as the database 70. Any discussion of the database 70 applies to the database 71 via the connection over the network 120. Functions and capabilities of exemplary embodiments are configured to be applied by the software tool 20, by the software tool 21, and/or by a combination of the software tools 20 and 21.

Furthermore, exemplary embodiments are not limited to but are capable of being implemented in the system 100 illustrated in FIG. 1. Additionally, the server 105 may be representative of numerous servers. The computer 10 may be representative of numerous computing devices. Likewise, the network 120 may be representative of numerous networks. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1. Additionally, the elements, devices, network entities, etc., discussed herein all contain the necessary software and hardware components to function as described, which include but are not limited to processors, memory, input/output devices, buses, software applications, etc.

Figure 2:
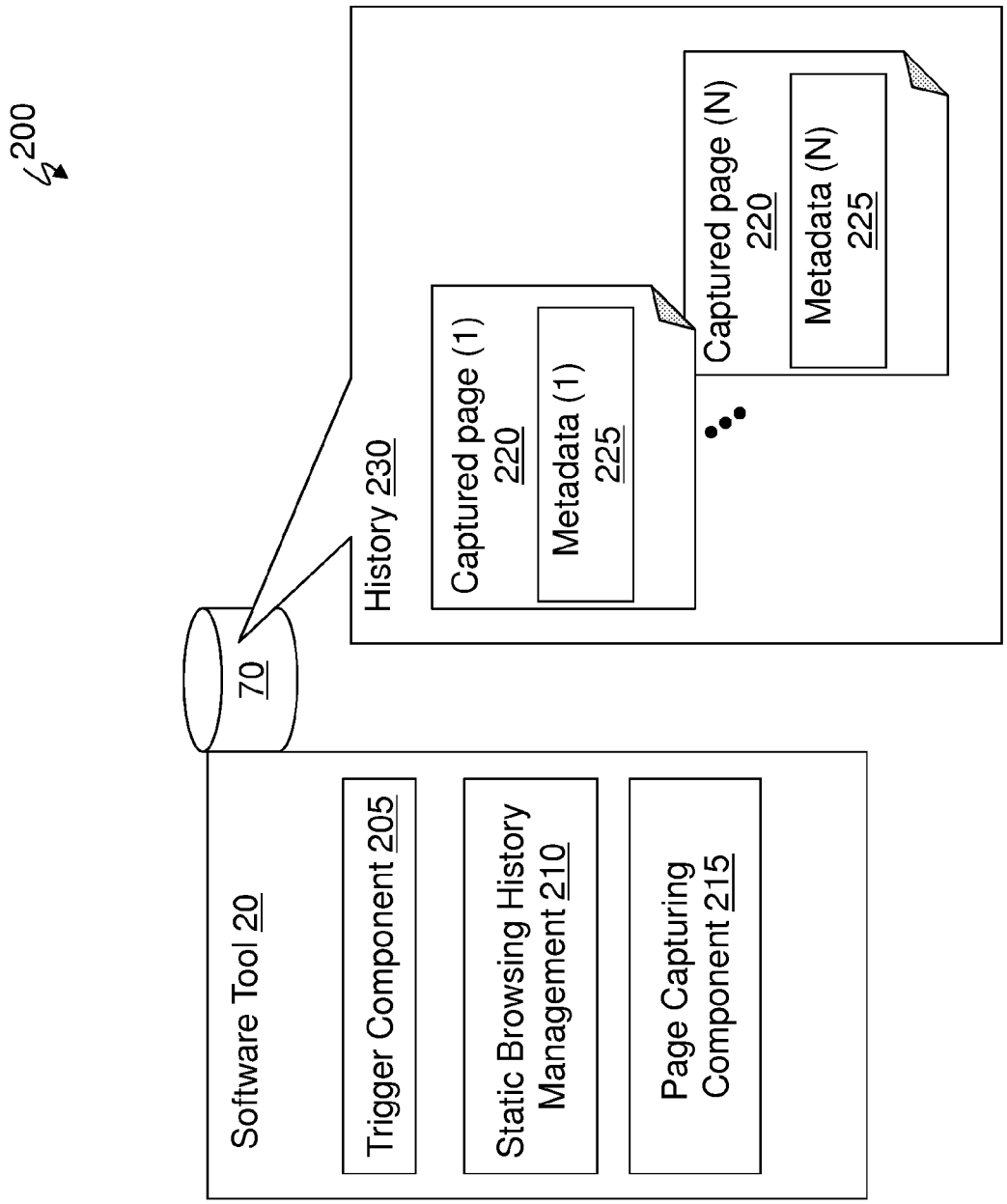
FIG. 2 is a block diagram illustrating further details of the software tool and the database in accordance with an exemplary embodiment.

Reference can be made to FIGS. 1 and 2, in which FIG. 2 is a block diagram 200 illustrating further details of the software tool 20 and the database 70 according to an exemplary embodiment. Although not shown for the sake of clarity, FIG. 2 includes all the elements of FIG. 1.

For the sake of illustration, it is assumed that the webpage 130 may be a dynamic webpage. Dynamic webpages webpages that are generated at the time of access by a user and/or change as a result of interaction with the user. Dynamic webpages are a fundamental part of Web 2.0 which facilitates information sharing across multiple websites, and use client-side scripting to change interface behaviors within a specific webpage, in response to mouse or keyboard actions or at specified timing events. The dynamic behavior occurs within the presentation/display of the webpage. A program running on the web server (server-side scripting) is used to change the web content on the webpage, or to adjust the sequence of or reload of the webpages.

Since the webpage 130 is dynamic (i.e., the webpage 130 changes), there can be different displayed pages (i.e., different displayed versions or instantiations) of the webpage 130. These pages of the webpage 130 are the different views, instances, displayed looks, etc. of the webpage 130 on the display 45, and the software tool 20 is configured to capture these different pages as discussed herein.

It is further assumed that the user of the computer 10 is viewing and interacting with the webpage 130 in the browser 25, and the webpage 130 is being served by the server 105. The software tool 20 is configured to provide a mechanism for the client (e.g., the computer 10) and the server 105 to keep the browsing history 230 of the webpage 130 (in the database 70) that a user has traversed through. The software tool 20 is configured to capture browsing history 230 (while not depending on the backend application) by storing captured pages 220 of the webpage 130 in the browser 25 as a bitmap, an image map, and/or static webpage in the database 70. The captured pages (by the software tool 20) of the particular webpage 130 are shown as captured pages 220. Additionally, the software tool 20 will also capture metadata 225 related to the corresponding captured pages 220 for storage in the database 70, and the corresponding metadata includes the time stamp, URL of the webpage, the user action causing the webpage 130 to be captured, and/or other metadata related to the webpage 130. Based on an algorithm, the software tool 20 is configured with one or more triggers, such as user actions, elapsed time (when displaying the webpage), percentage change (between a currently displayed page and a previously displayed page of the webpage 130), etc., for capturing the browsing history 230. After storing the browsing history 230 (for the webpage 130), the software tool 20 is configured to provide navigation (by the user) of the browsing history 230 independent from the current browsing windows (e.g., open or previously opened in the display 45), and independent of currently connected web applications. The software tool 20 can provide integration of the webpage with the browser history.

It is further assumed that the user is viewing and inputting data in the first page of an online fillable form of the webpage 130 displayed on the display 45. When the user selects (e.g., clicks) the next (or continue) button of the webpage 130 to move to the next page of the fillable form after completion of the first page, the previously input data in the first page of the fillable form would not normally be available to the user (e.g., if the user selected the back button to return to the first page); however, the software tool 20 is configured to capture the first page as one of the captured pages 220 along with its previously input data and related metadata 225 for the first page of the webpage 130 (website). All of which is stored in the database 70. In one case, the online fillable form may be a single page (or multipage) document in portable document format (PDF) or an HTML format. PDF is an open standard for document exchange, and is used for representing documents in a manner independent of application software, hardware, and operating systems. It is assumed in this example that the online fillable form does not provide an option for the user to save the data just input (i.e., typed) by the user; when the user selects, e.g., the submit button in the webpage 130, the user will not lose the input data in the fillable form because the software tool 20 is configured to recognize that the user action of selecting the submit button (and recognize each transition (such as, e.g., when a next/continue button is selected) to a new page of the fillable form). As such, the software tool 20 is configured to capture the page(s) of the fillable online form as respective captured page(s) 220 for each transition from one page and/or each transition to another page (i.e., each time the next, continue, submit, end, done, move, and/or proceed button is selected by the user). Accordingly, the user can select (in a graphical user interface of the software tool 20) the history 230 for the webpage 130 to view any of the captured pages 220 related to the webpage 130 (including the previously submitted fillable online form with the data input by the user). For example, the user can view each individually filled-in captured page 220 of the online form along with its respective metadata 225. The browsing history 230 may be securely stored in the database 70.

In FIG. 2, the software tool 20 includes three components, which are a trigger algorithm component 205, a static browsing history management component 210, and a page capturing component 215.

The trigger algorithm component 205 is configured to detect when there is a need to capture the current page of the webpage 130. Upon the detection of a need, the page capturing component 215 will capture the currently displayed page of the webpage 130 in the captured pages 220. The captured page of (captured pages 220) will be made available to the static browsing history management component 210.

There are many different trigger algorithms of the trigger algorithm component 205 including the user actions mentioned above. One or more of the trigger algorithms could be integrated and applied at the same time by the trigger algorithm component 205 to cause the page capturing component 215 to capture (e.g., take a snapshot of) the particular instance or page of the webpage 130. The following are examples of some of the possible trigger algorithms of the trigger algorithm component 205. One trigger of the software tool 20 may be a user action, such as clicking on a button (displayed in the browser 25), that caused the currently displayed page to change.

Another trigger of the software tool 20 may be a timer, such as once every 60 seconds, which will cause the trigger algorithm component 205 to detect if the currently displayed page (of the webpage 130) has more than a predefined percentage of change. This can also be applied to a webpage that has auto-refreshes, for example, such as to a webpage (like, e.g., webpage 130) which has a stock ticker that refreshes itself periodically. When the timer (of the trigger algorithm component 205) is triggered, the trigger algorithm component 205 will compare the currently displayed page of the webpage 130 and the previously captured page of the webpage 130 (which is stored in the captured pages 220). A new history (i.e., a new captured page 220 for the currently displayed page associated with the webpage 130) will be created if the currently displayed page displayed in the browser 25 (on display 45) is different by the predefined percentage from the previously captured page (already stored as one of the captured pages 220).

The page capturing component 215 is configured to capture the currently displayed page of the webpage 130, including area that is not in the currently viewable area (e.g., the user may need to scroll down to view that part of a page). The page can be captured as a standard HTML (Hyper Text Markup Language) page, a bitmap graphic, an image map file, and/or other technologies.

The page capturing component 215 can be utilized by the trigger algorithm component 205 to pre-capture a page of the webpage 130 before a trigger is fulfilled. When the pre-captured page is confirmed (e.g., one of the triggers discussed herein is met) that it should be in the history 230, the pre-captured page will be sent to the static browsing history management component 210 and stored as a captured page 220.

In one implementation, the static browsing history management component 210 can be implemented at the server side (owned by middleware) and/or in the web browser 25. When the page capturing component 215 sends the captured page to the static browsing history management component 210, the static browsing history management component 210 will add the captured page together with some metadata 225 to a data structure representing the history. As mentioned above, the metadata 225 can include the time stamp at which the page was captured from the webpage 130, the URL of the webpage 130, and other useful data.

The static browsing history management component 210 is configured to provide navigation and user customization functions, which allow a user to navigate the history 230 independent of the current webpage session for the webpage 130 (provided through the server 105). For example, although the computer 10 is no longer operatively connected to the server 105 for a web session related to the webpage 130, the user can still navigate through and view captured pages 220 in the history 230 for the webpage 130. Also, the static browsing history management component 210 is configured to allow a user to customize the trigger algorithm of the trigger algorithm component 205 and page capturing technology of the page capturing component 215.

Note that although the software tool 20 is shown separately from the browser 25, the software tool 20 may be integrated with the browser 25. In one implementation, the software tool 20 may be a plug-in and/or add-on to the browser 25.

Figure 3:
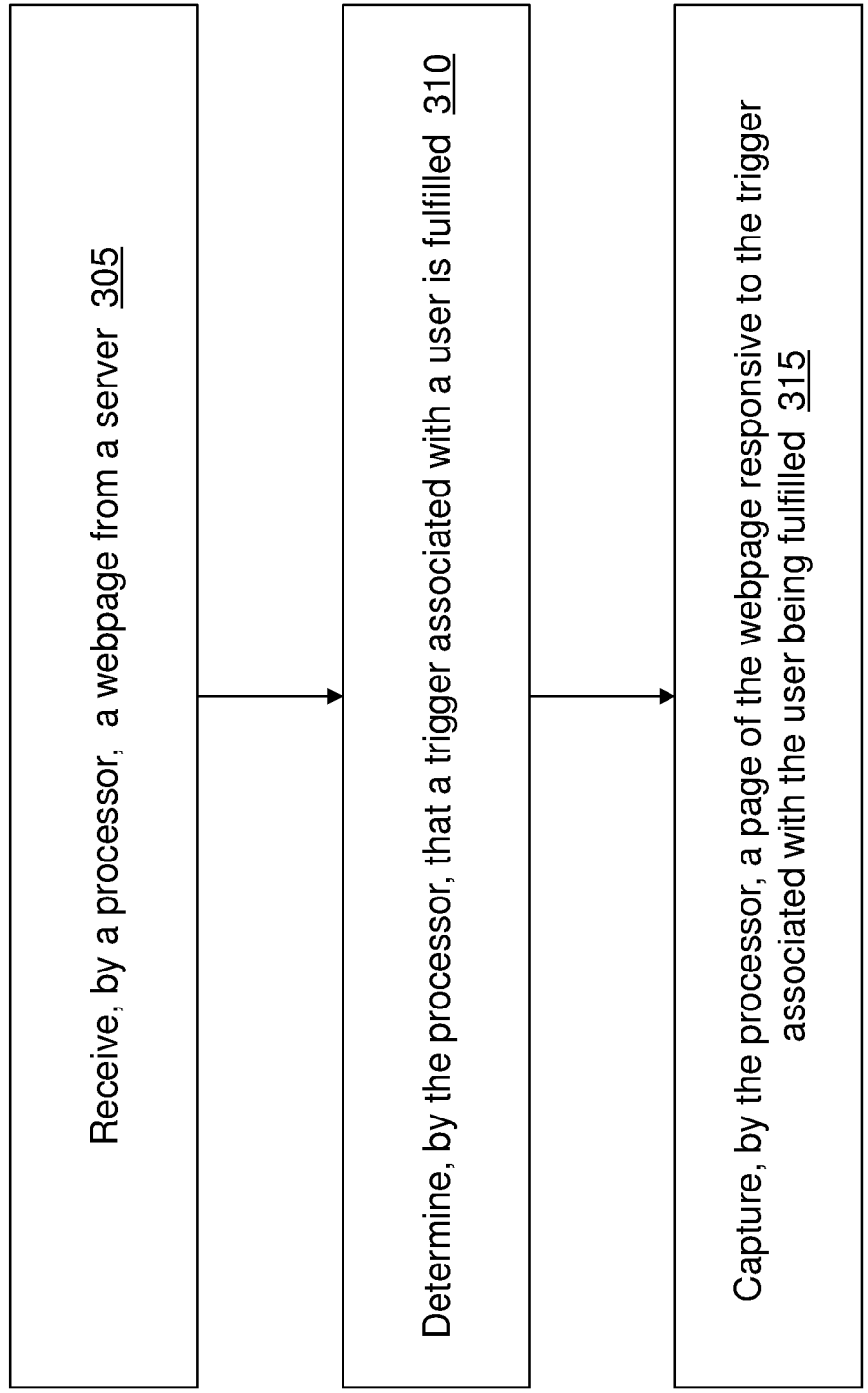
FIG. 3 is a flowchart illustrating a method for capturing and providing browser history in accordance with an exemplary embodiment.

Now, turning to FIG. 3, a method 300 of the software tool 20 for capturing and providing browser history is shown according to an exemplary embodiment.

The software tool 20 (running on the processor 60) is configured to receive a webpage (such as the webpage 130) from the server 105 at block 305. This webpage may be dynamic.

The software tool 20 is configured to determine that a trigger associated with a user is fulfilled at block 310. The software tool 20 is configured to capture a page of the webpage 130 responsive to the trigger associated with the user being fulfilled at block 315.

Additionally, the trigger (of the software tool 20) is configured to cause the page of the webpage 130 to be captured, e.g., as one of the captured pages 220, along with respective metadata 225 related to the particular captured page 220. Each captured page 220 has its own metadata 225 captured at the same time and stored in the history 230 (related to this webpage 130). The trigger of the software tool 20 is configured to be set by the user in advance, and the metadata captured (by the software tool 20) along with the page can comprise a time stamp, a universal resource locator, and information filled in by the user. The software tool 20 is configured to display a listing of browsing history, to the user, in which the displayed listing of the browsing history shows the captured page and its corresponding metadata, the listing of browsing history can be displayed to the user as a thumbnail of the webpage (or captured page) together with the corresponding metadata.

The trigger of the software tool 20 is configured to be fulfilled when a predefined amount of time elapses as set by the user in advance. For example, the webpage 130 may be refreshed/reloaded with data every 5 minutes (and/or 10, 15, 20, 30 minutes), and the user of the software tool 20 can set the trigger for the webpage 130 to capture the currently displayed page (of the webpage 130) every 5 minutes (and/or any corresponding minutes). The time for the trigger is not meant to be limited and can be set in the software tool 20 to be any time period including X seconds, Y minutes, Z hours, N days, K weeks, J months, and any combination thereof.

Also, the trigger of the software tool 20 is configured to be set by the user based on a predefined amount of change between display of a first page and a display of second page of the webpage 130, and responsive to the software tool 20 determining that the predefined amount of change has occurred for the webpage 130, the software tool 20 is configured to capture the second (next) page to be stored as one of the captured pages 220. For any page (of the webpage) currently being displayed, the software tool 20 is configured to determine if the predefined amount of change has occurred between a previously displayed page and a currently displayed page; the same process occurs for each successively displayed page of the webpage 130, such that the successively displayed pages can be captured when the predefined amount of change occurs. In one case, the predefined amount of change corresponds to the first page differing from the second page by a predefined percentage (such as 5, 10, 15, 20, 25, 30, 40, 50% and so forth) as set by the user and/or automatically set by the software tool 20 as a default percentage. The trigger of the software tool 20 can be set (by the user) to be fulfilled by user action in which the user action comprises interacting with a currently displayed page of the webpage. For example, the user action (recognized by the software tool 20 to capture the currently displayed page) is configured to be set by the user (and/or as a default setting) to include: filling in a form on the currently displayed page, submitting a completed form, making a selection on the currently displayed page, selecting a button to traverse to a subsequently displayed page, selecting a button to traverse to a previously displayed page, selecting a link on the currently displayed page, selecting a button to end a session on the currently displayed page, filling in a particular field on the currently displayed page, interacting with dynamic content (that may constantly, intermittently, and/or periodically change) such as Adobe® Flash®, AJAX (Asynchronous JavaScript®), and PHP (Hypertext Preprocessor), and/or closing/exiting the currently displayed page.

Adobe Flash® is a multimedia platform used to add animation, video, and interactivity to webpages, and Adobe Flash® is frequently used for advertisements, games and flash animations for broadcast. AJAX is a group of interrelated web development techniques used on the client-side to create asynchronous web applications, and with Ajax, web applications can send data to, and retrieve data from, a server asynchronously (in the background) without interfering with the display and behavior of the existing page. PHP is a general-purpose server-side scripting language originally designed for Web development to produce dynamic webpages.

Figure 4:
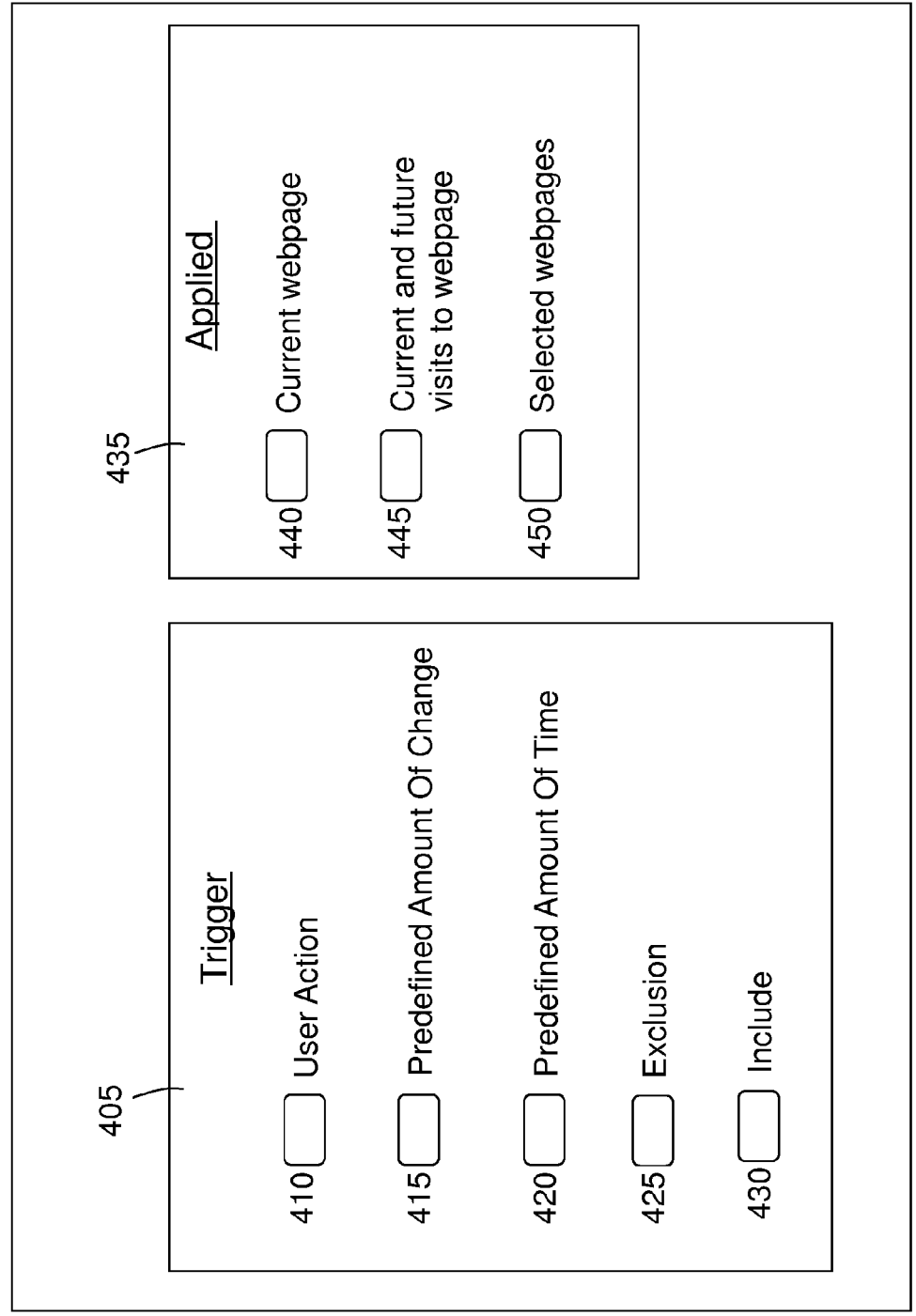
FIG. 4 is a block diagram of a graphical user interface (GUI) of the software tool for setting one or more triggers which can be applied to one or more webpages in accordance with an exemplary embodiment.

FIG. 4 is a block diagram of a graphical user interface (GUI) 400 of the software tool 20 for setting one or more triggers which can be applied to one or more webpages according to an exemplary embodiment. As one example implementation, the graphical user interface 400 is displayed on the display 45 and may have a trigger panel 405 and an applied panel 435.

The trigger panel 405 includes buttons and/or selections that the user of the computer 10 may select using the user interface 50. The buttons and/or selection may include a user action button 410 for selecting and/or inputting the user action. In one case, when the user selects the user action button 410, the software tool 20 may display a list of options for user actions from which the user can select, and the list options may include each of the user actions discussed herein. The user can select multiple user actions as triggers.

When the user selects the predefined amount of change button 415, the software tool 20 can display options (e.g., 5%, 10%, 20%, 30%, 40%, 50%, 60%, etc.) of an amount of change from one page to the next page that will trigger the software tool 20 to capture the currently displayed page of the webpage 130. Additionally, when the button 415 is selected, the software tool 20 can display a field in which the user can input a desired percentage, can input greater than a certain percentage, can input less than a certain percentage, and/or can input greater than percentage X but less than percentage Y.

When the user selects the predefined amount of time button 420, the software tool 20 may display a list of time periods to elapse from which the user can choose and/or the software tool 20 may display a field in which the user can input a time period to elapse as the trigger to capture the currently displayed page. The user can select the time period to elapse as the trigger to cause the software tool 20 to capture the currently displayed page.

When the user selects an exclusion button 425, the software tool 20 is configured to allow the user to select one or more locations on the webpage 130 to exclude from being considered. For example, when the exclusion button 425 has been selected, the software tool 20 is configured to allow the user to highlight and/or draw a box around a location(s) on the webpage such that the software tool 20 does not consider changes in this identified location (such as an advertisement box) of the webpage 130 to be a trigger. As such, changes in any of the identified locations are not taken into consideration by the software tool 20 for determining if a trigger is met to capture the currently displayed page.

Conversely, when the user selects an include button 430, the software tool 20 is configured to allow the user to select one or more locations on the webpage 130 to (only) include when determining if the trigger is met. For example, responsive to selecting the include button 430, the software tool 20 is configured to allow the user to highlight and/or draw a box around particular locations that are to be considered to determine if the predefined amount of change has occurred (without considering other locations on the webpage 130 that have not been selected).

The applied panel 435 displayed by the software tool 20 allows the user to identify whether the trigger (only) applies to the current webpage (of a website) by selecting a current webpage button 440. The current webpage is the URL of the webpage (e.g., webpage 130) currently being displaying up front in the browser 25. The software tool 20 allows the user to select if the trigger applies to both current (the present) and future visits to the webpage 130 by selecting the current and future visits to the webpage button 445, for the currently displayed webpage. Also, the user can select the selected webpage(s) button 450, and the software tool 20 is configured to display fields for the user to input (e.g., cut and paste, browse favorites with bookmarked webpages/websites, etc.) desired webpages/websites into the fields. These input links/URLs to the webpages will then have the triggers applied to them by the software tool 20, such that whenever the user visits these selected webpages, the triggers selected in trigger panel 405 will (always) apply.

Note that the user can repeat this process for individual webpages as desired, and can later remove triggers for individual webpages in the GUI 400. Each webpage can have its own criteria for triggers.

Figure 5:
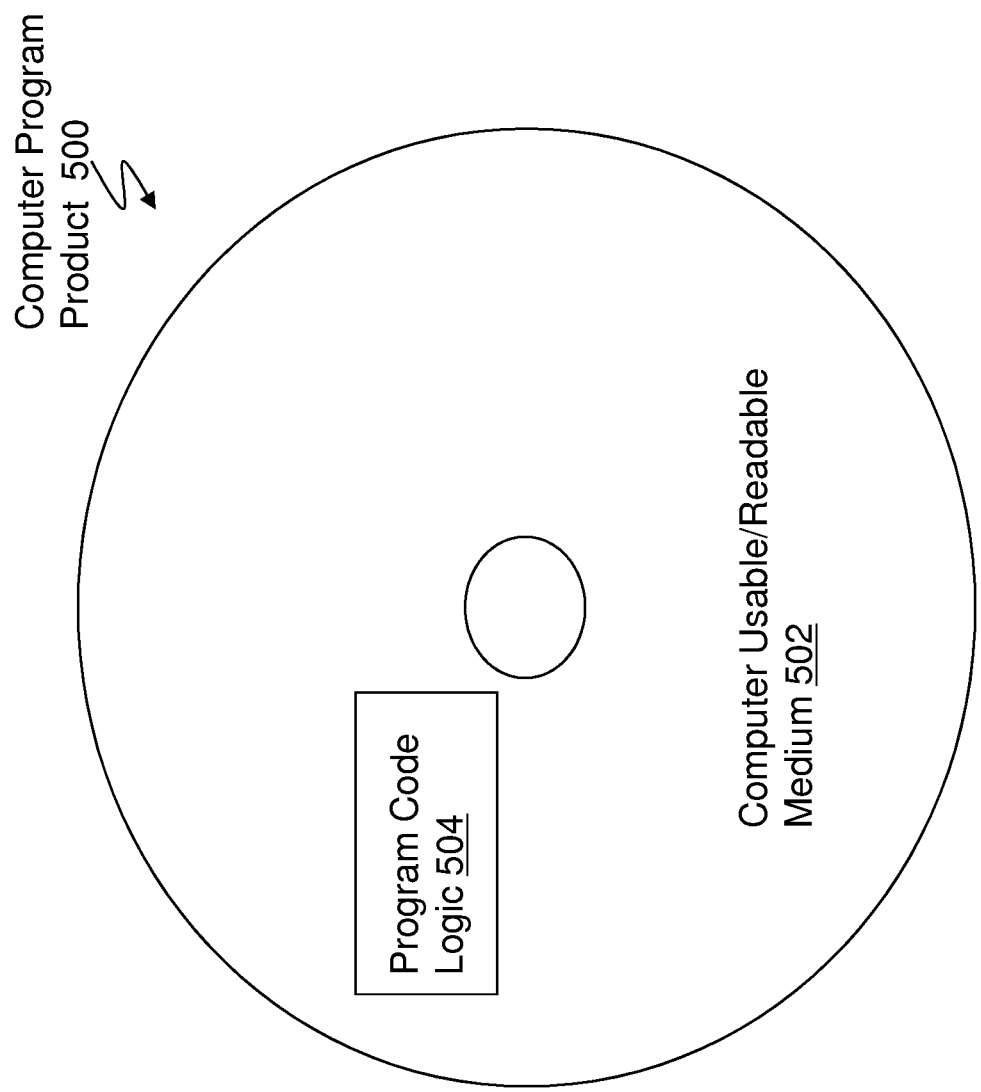
FIG. 5 is a schematic diagram of a computer program product on a computer readable/usable medium with computer program code logic in accordance with an exemplary embodiment.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

Figure 6:
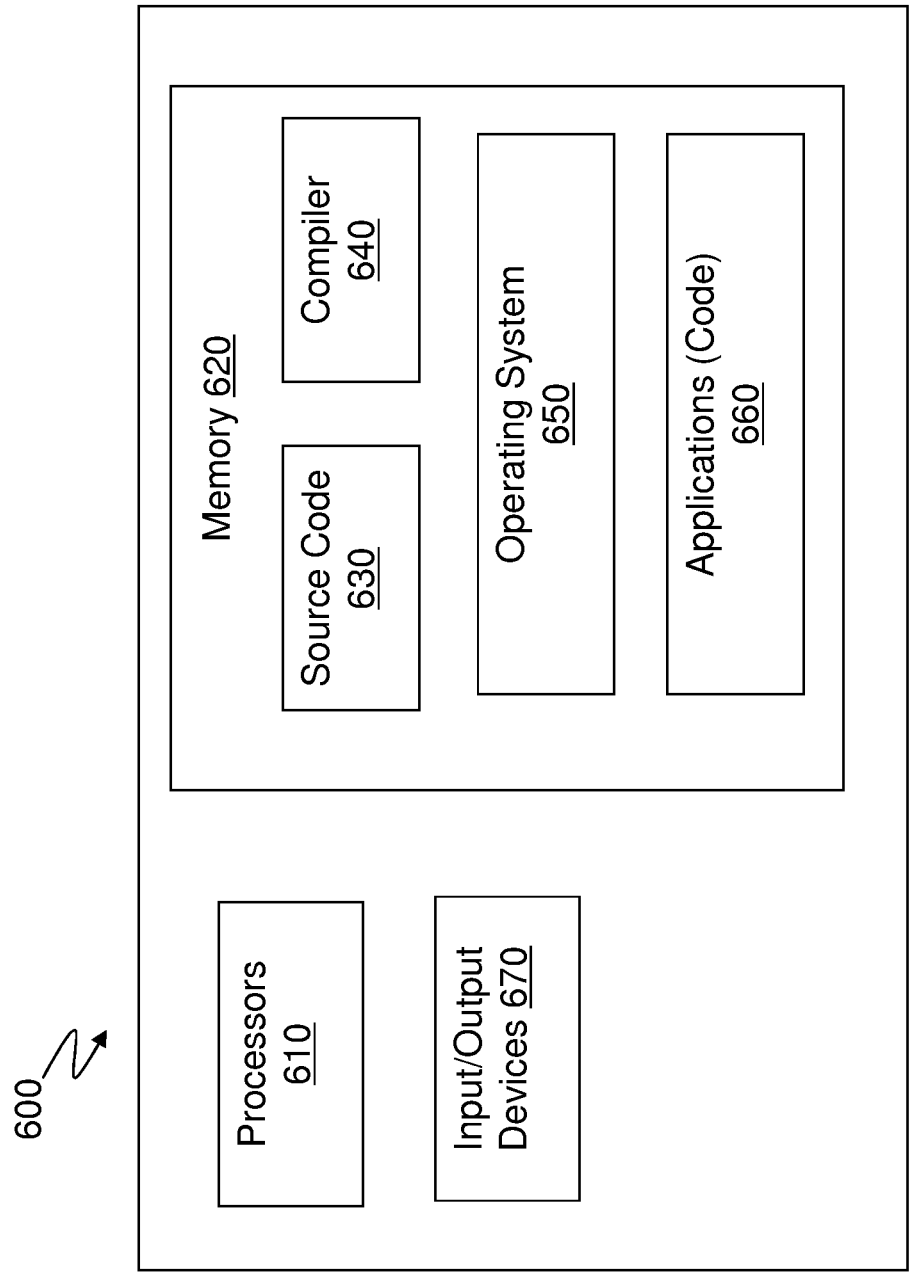
FIG. 6 is a block diagram illustrating an example of a computer having capabilities, which may be included in and utilized by exemplary embodiments.

FIG. 6 illustrates an example of a computer 600 having capabilities, which may be included in exemplary embodiments. Various methods, procedures, modules, flow diagrams, tools, applications, and techniques discussed herein may also incorporate and/or utilize the capabilities of the computer 600, as appreciated by one skilled in the art. Moreover, capabilities of the computer 600 may be utilized to implement features of exemplary embodiments discussed herein. One or more of the capabilities of the computer 600 may implement (or be utilized in conjunction with) any element discussed herein such as but not limited to elements in FIGS. 1-5.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, controllers, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 610 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for capturing browsing history of a webpage, comprising:
    receiving, by a processor, the webpage from a server, wherein the webpage is a dynamic webpage that is generated at the time of access by the user and the webpage changes as a result of interaction with the user;
    determining, by the processor, that a trigger associated with a user is fulfilled, wherein the trigger is configured to be fulfilled based on determining that a predefined amount of change set by the user has occurred when comparing display of a first instance of the webpage previously captured and display of a second instance of the webpage currently displayed on a display screen;
    capturing, by the processor, the second instance of the webpage having a changed visual presentation responsive to the trigger associated with the user being fulfilled;
    wherein the capturing comprises pre-capturing an instance of the webpage as a pre-captured instance before the trigger is fulfilled;
    responsive to confirming that the pre-captured instance is confirmed by fulfilling the trigger, sending the pre-captured instance to a static browsing history management component to be stored as a captured instance of the webpage;
    wherein the user is provided access to navigation of the browsing history independent from the current browsing windows;
    displaying a graphical user interface comprising an applied panel that displays a plurality of applied buttons selectable by the user indicating how the selected trigger is applied, the plurality of applied buttons comprising:
    a current webpage button for allowing the user to identify whether the trigger applies only to the current webpage of a website;
    a current and future visit webpage button for allowing the user to select if the trigger applies to both current and future visits to the webpage; and
    a selected webpages button configured to display fields for the user to input desired webpages into the fields for identifying the webpages to which the triggers will apply.

2. The method of claim 1, wherein the trigger is configured to cause an instance of the webpage to be captured; and
    wherein metadata related to the instance is captured along with the instance.

3. The method of claim 2, wherein the trigger is configured to be set by the user in advance;
  wherein the metadata captured along with the instance comprises at least one of a time stamp, a universal resource locator, a uniform resource identifier, and information filled in by the user;
  wherein a listing of browsing history, as displayed to the user, comprises the instance captured and the metadata corresponding to that captured instance; and
  wherein the listing of browsing history is displayed to the user as a thumbnail of the webpage together with the metadata for the instance.

4. The method of claim 1, wherein the trigger is configured to be fulfilled when a predefined amount of time elapses as set by the user in advance, wherein elapsing of the predefined amount of time causes an image map of the instance of the webpage to be stored;
  displaying a graphical user interface comprising a trigger panel and the applied panel;
  wherein the trigger panel displays types of trigger buttons selectable by the user, the types of trigger buttons configured to permit the user to select the trigger to be fulfilled.

5. The method of claim 1, wherein the trigger is configured to be fulfilled based on determining that a predefined amount of change set by the user has occurred;
  wherein the predefined amount of change corresponds to an image map of the first instance differing from the second instance by a predefined percentage.

6. The method of claim 1, wherein the trigger is set to be fulfilled by user action in which the user action comprises interacting with a currently displayed instance of the webpage.

7. The method of claim 6, wherein the user action is configured to be set to:
  filling in a form on the currently displayed instance;
  submitting a completed form;
  making a selection on the currently displayed instance;
  selecting a button to traverse to a subsequently displayed instance in order to fulfill the trigger for capturing the second instance of the webpage;
  selecting a button to traverse to a previously displayed instance;
  selecting a link on the currently displayed instance;
  selecting a button to end a session on the currently displayed instance in order to fulfill the trigger for capturing the second instance of the webpage;
  interacting with dynamic content that periodically changes;
  filling in a particular field on the currently displayed instance; and
  closing the currently displayed instance in order to fulfill the trigger for capturing the second instance of the webpage.

8. A system for capturing browsing history of a webpage, comprising:
  memory configured to store a program; and
  a processor, functionally coupled to the memory, the processor being responsive to computer-executable instructions contained in the program and operative to:
  receive the webpage from a server, wherein the webpage is a dynamic webpage that is generated at the time of access by the user and the webpage changes as a result of interaction with the user;
  determine that a trigger associated with a user is fulfilled, wherein the trigger is configured to be fulfilled based on determining that a predefined amount of change set by the user has occurred when comparing display of a first instance of the webpage previously captured and display of a second instance of the webpage currently displayed on a display screen;
  capture the second instance of the webpage having a changed visual presentation responsive to the trigger associated with the user being fulfilled by the determining that the second instance currently displayed on the display screen is different from the first instance by the predefined amount of change;
  wherein the capturing comprises pre-capturing an instance of the webpage as a pre-captured instance before the trigger is fulfilled;
  responsive to confirming that the pre-captured instance is confirmed by fulfilling the trigger, sending the pre-captured instance to a static browsing history management component to be stored as a captured instance of the webpage;
  wherein the user is provided access to navigation of the browsing history independent from the current browsing windows;
  displaying a graphical user interface comprising an applied panel that displays a plurality of applied buttons selectable by the user indicating how the selected trigger is applied, the plurality of applied buttons comprising:
  a current webpage button for allowing the user to identify whether the trigger applies only to the current webpage of a website;
  a current and future visit webpage button for allowing the user to select if the trigger applies to both current and future visits to the webpage; and
  a selected webpages button configured to display fields for the user to input desired webpages into the fields for identifying the webpages to which the triggers will apply.

9. The system of claim 8, wherein the trigger is configured to cause an instance of the webpage to be captured; and
  wherein metadata related to the instance is captured along with the instance.

10. The system of claim 9, wherein the trigger is configured to be set by the user in advance;
  wherein the metadata captured along with the instance comprises at least one of a time stamp, a universal resource locator, a uniform resource identifier, and information filled in by the user;
  wherein a listing of browsing history, as displayed to the user, comprises the instance captured and the metadata corresponding to that captured instance; and
  wherein the listing of browsing history is displayed to the user as a thumbnail of the webpage together with the metadata for the instance.

11. The system of claim 8, wherein the trigger is configured to be fulfilled when a predefined amount of time elapses as set by the user in advance.

12. The system of claim 8, wherein the trigger is configured to be set by the user based on a predefined amount of change between an image map display of the first instance and display of the second instance of the webpage; and
  wherein responsive to the processor determining that the predefined amount of change has occurred for the webpage, the processor is configured to capture the second instance.

13. The system of claim 12, wherein the predefined amount of change corresponds to the image map of the first instance differing from the second instance by a predefined percentage.

14. The system of claim 8, wherein the trigger is set to be fulfilled by user action in which the user action comprises interacting with a currently displayed instance of the webpage.

15. The system of claim 14, wherein the user action is configured to be set to:
- filling in a form on the currently displayed instance;
- submitting a completed form;
- making a selection on the currently displayed instance;
- selecting a button to traverse to a subsequently displayed instance;
- selecting a button to traverse to a previously displayed instance;
- selecting a link on the currently displayed instance;
- selecting a button to end a session on the currently displayed instance;
- interacting with dynamic content that periodically changes;
- filling in a particular field on the currently displayed instance; and
- closing the currently displayed instance.

16. A computer program product for capturing browsing history of a webpage, the computer program product comprising:
- a non-transitory computer readable storage medium having computer readable program code embodied therewith, the computer readable program code comprising:
- receiving, by a processor, the webpage from a server, wherein the webpage is a dynamic webpage that is generated at the time of access by the user and the webpage changes as a result of interaction with the user;
- determining, by the processor, that a trigger associated with a user is fulfilled, wherein the trigger is configured to be fulfilled based on determining that a predefined amount of change set by the user has occurred when comparing display of a first instance of the webpage previously captured and display of a second instance of the webpage currently displayed on a display screen;
- capturing, by the processor, the second instance of the webpage having a changed visual presentation responsive to the trigger associated with the user being fulfilled by the determining that the second instance currently displayed on the display screen is different from the first instance by the predefined amount of change;
- wherein the capturing comprises pre-capturing an instance of the webpage as a pre-captured instance before the trigger is fulfilled;
- responsive to confirming that the pre-captured instance is confirmed by fulfilling the trigger, sending the pre-captured instance to a static browsing history management component to be stored as a captured instance of the webpage;
- wherein the user is provided access to navigation of the browsing history independent from the current browsing windows;
- displaying a graphical user interface comprising an applied panel that displays a plurality of applied buttons selectable by the user indicating how the selected trigger is applied, the plurality of applied buttons comprising:
- a current webpage button for allowing the user to identify whether the trigger applies only to the current webpage of a website;
- a current and future visit webpage button for allowing the user to select if the trigger applies to both current and future visits to the webpage; and
- a selected webpages button configured to display fields for the user to input desired webpages into the fields for identifying the webpages to which the triggers will apply.

17. The computer program product of claim 16, wherein the trigger is configured to cause an instance of the webpage to be captured; and
- wherein metadata related to the instance is captured along with the instance.

18. The computer program product of claim 17, wherein the trigger is configured to be set by the user in advance;
- wherein the metadata captured along with the instance comprises at least one of a time stamp, a universal resource locator, a uniform resource identifier, and information filled in by the user;
- wherein a listing of browsing history, as displayed to the user, comprises the instance captured and the metadata corresponding to that captured instance; and
- wherein the listing of browsing history is displayed to the user as a thumbnail of the webpage together with the metadata for the instance.

19. The computer program product of claim 16, wherein the trigger is configured to be fulfilled when a predefined amount of time elapses as set by the user in advance.

20. The computer program product of claim 16, wherein the trigger is configured to be set by the user based on a predefined amount of change between an image map display of the first instance and display of the second instance of the Web 2.0 webpage; and
- wherein responsive to the processor determining that the predefined amount of change has occurred for the webpage, the processor is configured to capture the second instance.

21. The computer program product of claim 20, wherein the predefined amount of change corresponds to the image map of the first instance differing from the second instance by a predefined percentage.

* * * * *